United States Patent
Leung

(10) Patent No.: US 8,159,455 B2
(45) Date of Patent: Apr. 17, 2012

(54) METHODS AND APPARATUS FOR PROCESSING COMBINATIONS OF KINEMATICAL INPUTS

(75) Inventor: Omar S. Leung, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 877 days.

(21) Appl. No.: 12/176,148

(22) Filed: Jul. 18, 2008

(65) Prior Publication Data

US 2010/0013768 A1 Jan. 21, 2010

(51) Int. Cl.
*G06F 3/033* (2006.01)

(52) U.S. Cl. .................................. 345/156; 345/173

(58) Field of Classification Search .......... 345/156–169, 345/172, 173; 463/1–47; 715/863; 382/296
See application file for complete search history.

(56) References Cited

U.S. PATENT DOCUMENTS

| | | | |
|---|---|---|---|
| 5,543,591 A * | 8/1996 | Gillespie et al. | 178/18.03 |
| 5,880,411 A * | 3/1999 | Gillespie et al. | 178/18.01 |
| 6,084,572 A * | 7/2000 | Yaniger et al. | 345/159 |
| 6,243,075 B1 * | 6/2001 | Fishkin et al. | 345/156 |
| 6,649,905 B2 * | 11/2003 | Grenlund | 250/227.14 |
| 6,750,852 B2 * | 6/2004 | Gillespie et al. | 345/173 |
| 6,900,793 B2 * | 5/2005 | Goh et al. | 345/164 |
| 6,982,700 B2 * | 1/2006 | Rosenberg et al. | 345/157 |
| 7,023,536 B2 * | 4/2006 | Zhang et al. | 356/138 |
| 7,096,454 B2 * | 8/2006 | Damm et al. | 717/105 |
| 7,136,710 B1 * | 11/2006 | Hoffberg et al. | 700/83 |
| 7,156,773 B2 * | 1/2007 | Takai et al. | 482/7 |
| 7,656,393 B2 * | 2/2010 | King et al. | 345/173 |
| 7,859,519 B2 * | 12/2010 | Tulbert | 345/173 |
| 2002/0036617 A1 * | 3/2002 | Pryor | 345/156 |
| 2002/0054013 A1 * | 5/2002 | Graham | 345/156 |
| 2007/0259716 A1 * | 11/2007 | Mattice et al. | 463/36 |
| 2008/0080789 A1 * | 4/2008 | Marks et al. | 382/296 |

FOREIGN PATENT DOCUMENTS

| | | | |
|---|---|---|---|
| JP | 1997-054653 | * | 2/1997 |
| JP | 2006-221297 | * | 8/2006 |
| JP | 2007-018274 | * | 1/2007 |

* cited by examiner

*Primary Examiner* — Quan-Zhen Wang
*Assistant Examiner* — Michael J Eurice
(74) *Attorney, Agent, or Firm* — Schwegman, Lundberg & Woessner, P.A.

(57) ABSTRACT

Methods and apparatus for processing combinations of force and velocity data generated over a given period of time. In one embodiment, an input device comprising one or more force sensors and one or more motion sensors is manipulated relative to a surface. A receiving system is adapted to receive input sequences or "gestures" which are triggered upon the occurrence of one or more conditions detected by the input device. An application executing in the receiving system may be implemented such that the system responds differently to each specific gesture provided by the user.

41 Claims, 14 Drawing Sheets

METHODS AND APPARATUS FOR PROCESSING COMBINATIONS OF KINEMATICAL INPUTS

FIELD OF THE INVENTION

The present invention relates generally to the field of data input. More particularly, the present invention is directed in one exemplary aspect to an input device adapted to process combinations of force and velocity data.

SUMMARY OF THE INVENTION

The present invention is directed in one exemplary aspect to an input device capable of detecting its present velocity as well as various forces exerting upon it. Force and velocity data are generated after receiving input from one or more sensory modules comprised within the input device. If the force and velocity data from a target interval match one or more predetermined gesture profiles, a receiving device can then process the identified gesture accordingly.

Some embodiments of the present invention therefore enable a user to provide a series of gestures as input to the receiving device. Such gestures may include, for example, brushing motions, scooping motions, nudges, tilt and slides, and tilt and taps. The application can then respond to each gesture (or gesture combination) in any number of ways.

Embodiments of the present invention may therefore have applicability to any electronic system or application capable of receiving input. For example, embodiments of the present invention may be useful with video games, file browsing, interactive navigation, communication systems, control systems, military systems, medical devices, and industrial applications.

In a first aspect of the invention, an input system is disclosed. In one embodiment, the input system comprises: a force sensor; a velocity sensor; and a processor in communication with the force and velocity sensors and operable to determine whether at least one of a plurality of gestures has been performed using an input device.

In a second aspect of the invention, a method is disclosed. In one embodiment, the method comprises: estimating a force applied to an apparatus during a first period; estimating a velocity associated with the apparatus during the first period; and selecting one of a plurality of predetermined gestures based at least in part upon the force and the velocity.

In a third aspect of the invention, a computer readable medium is disclosed. In one embodiment, the computer readable medium comprises instructions which, when executed by a computer, perform a process comprising: estimating a velocity attained by an input device; estimating a force exerted upon the input device; and determining whether one of a plurality of predetermined gestures has been performed using the input device based at least in part on the estimated force and velocity.

In a fourth aspect of the invention, a system is disclosed. In one embodiment, the system comprises: an input device, comprising one or more force modules and one or more velocity modules; a processor in communication with the force and velocity modules and operable to determine whether at least one of a plurality of gestures has been performed using the input device; a computing device in communication with the processor and operable to receive a signal from processor, wherein the signal is indicative of the determined at least one gesture; and a display device in communication with the computing device for displaying at least one object response in accordance with the at least one gesture.

BRIEF DESCRIPTION OF THE DRAWINGS

FIG. 6b is a block diagram illustrating the gesture depicted by FIG. 6a.

FIG. 8b is a block diagram illustrating the gesture depicted by FIG. 8a.

FIG. 10b is a block diagram illustrating the gesture depicted by FIG. 10a.

FIG. 15b is a block diagram depicting a method of triggering the gesture depicted in FIG. 15a.

DETAILED DESCRIPTION OF THE EXEMPLARY EMBODIMENTS

Figure 1:
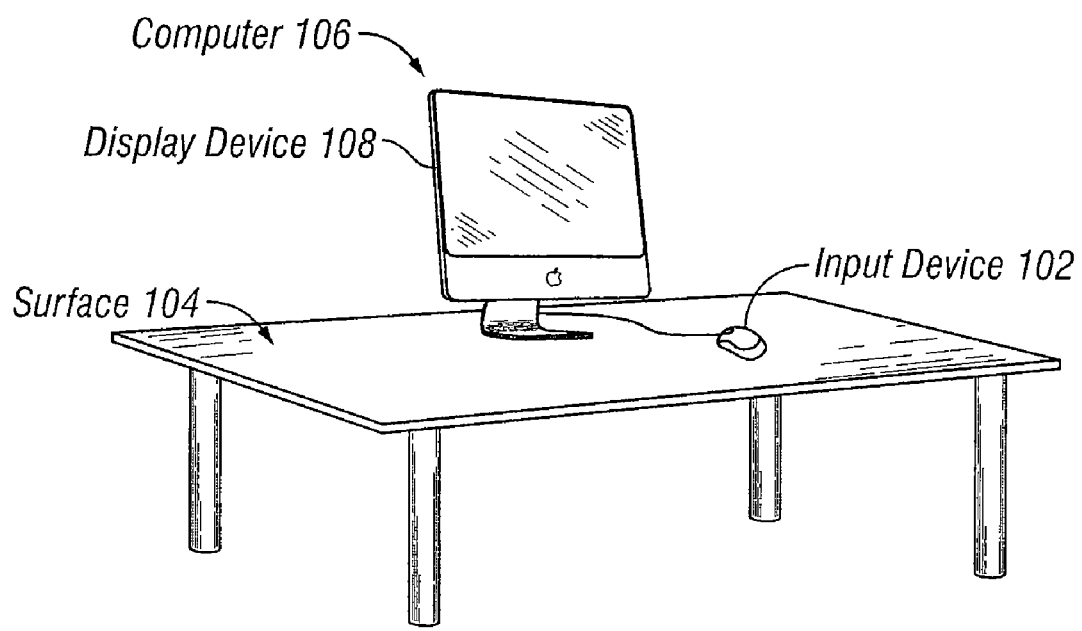
FIG. 1 is a block diagram illustrating a typical environment in which an input device may be used according to one embodiment of the present invention.

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

As used herein, the term "application" includes without limitation any unit of executable software that implements a specific functionality or theme. The unit of executable software may run in a predetermined environment; for example, a downloadable Java Xlet™ which runs within the JavaTV™ environment.

As used herein, the terms "computer program" and "software" include without limitation any sequence of human or machine cognizable steps that are adapted to be processed by a computer. Such may be rendered in any programming language or environment including, for example, C/C++, Fortran, COBOL, PASCAL, Perl, Prolog, assembly language, scripting languages, markup languages (e.g., HTML, SGML, XML, VoXML), functional languages (e.g., APL, Erlang, Haskell, Lisp, ML, F# and Scheme), as well as object-oriented environments such as the Common Object Request Broker Architecture (CORBA), Java™ (including J2ME, Java Beans, etc.).

As used herein, the term "display" includes any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices may also include less dynamic devices such as printers, e-ink devices, and other similar structures.

As used herein, the term "interface" refers to any signal or data interface with a component or network including, without limitation, those compliant with USB (e.g., USB2), FireWire (e.g., IEEE 1394b), Ethernet (e.g., 10/100, 10/100/1000 Gigabit Ethernet, 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a, b, g, n), WiMAX (802.16), PAN (802.15), or IrDA families.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As user herein, the term "module" refers to any unit or combination of units incorporating software, firmware, hardware, or any combination thereof that is designed and configured to perform a desired function.

As used herein, the terms "processor," "microprocessor," and "digital processor" refer to all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, and application-specific integrated circuits (ASICs). Such processors may be contained on a single unitary IC die, or distributed across multiple components.

As used herein, the terms "receiving device" and "receiver" include without limitation video game consoles, set-top boxes, televisions, personal computers (whether desktop, laptop, or otherwise), digital video recorders, communications equipment, terminals, and display devices.

As used herein, the term "wireless" refers to any wireless signal, data, communication, or other interface including, without limitation, Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

FIG. 1 is a block diagram illustrating a typical environment in which an input device can be used according to one embodiment of the present invention. An input device 102 is initially positioned upon a surface 104 such as a desk or a tabletop. In order to generate input data, a user manipulates the input device 102 relative to the surface 104. In one embodiment, input data may be generated by the input device 102 without the use of buttons.

Note that in FIG. 1, the surface 104 is depicted as being flat or substantially flat. However, neither condition is necessary according to embodiments of the present invention. Also note that in some embodiments, the surface 104 need not necessarily be situated beneath the input device 102. For example, the surface 104 may be tilted, situated above the input device 102, inverted, or vertically oriented. Also note that in some embodiments, multiple surfaces 104 can be utilized.

A receiving device (such as the depicted computer 106) is adapted to receive input data generated from the input device 102. In one embodiment, the receiving device comprises at least one interface adapted to receive the generated data. The input device 102 can communicate with the receiving device over a wireless communication link (such as, for example, WiFi or Bluetooth) or over a wired communication link (such as a serial bus cable or other physical connector).

The receiving device is adapted to display a navigational object (for example, a pointer, cursor, selector box, or other such indicator) upon its display screen 108. During operation, when the user manipulates the input device 102 relative to the surface 104, the input signals are transmitted to the computer 106 and the navigational object responds according to the user's input. It is understood that the receiving device can be any type of computing device having a display such as an iMac™ computer or a personal computer having a separate display monitor, for example. Other types of computing devices having a display or in communication with a display (e.g., by a wired or wireless communication link) would be readily apparent to those of ordinary skill in the art.

Figure 2:
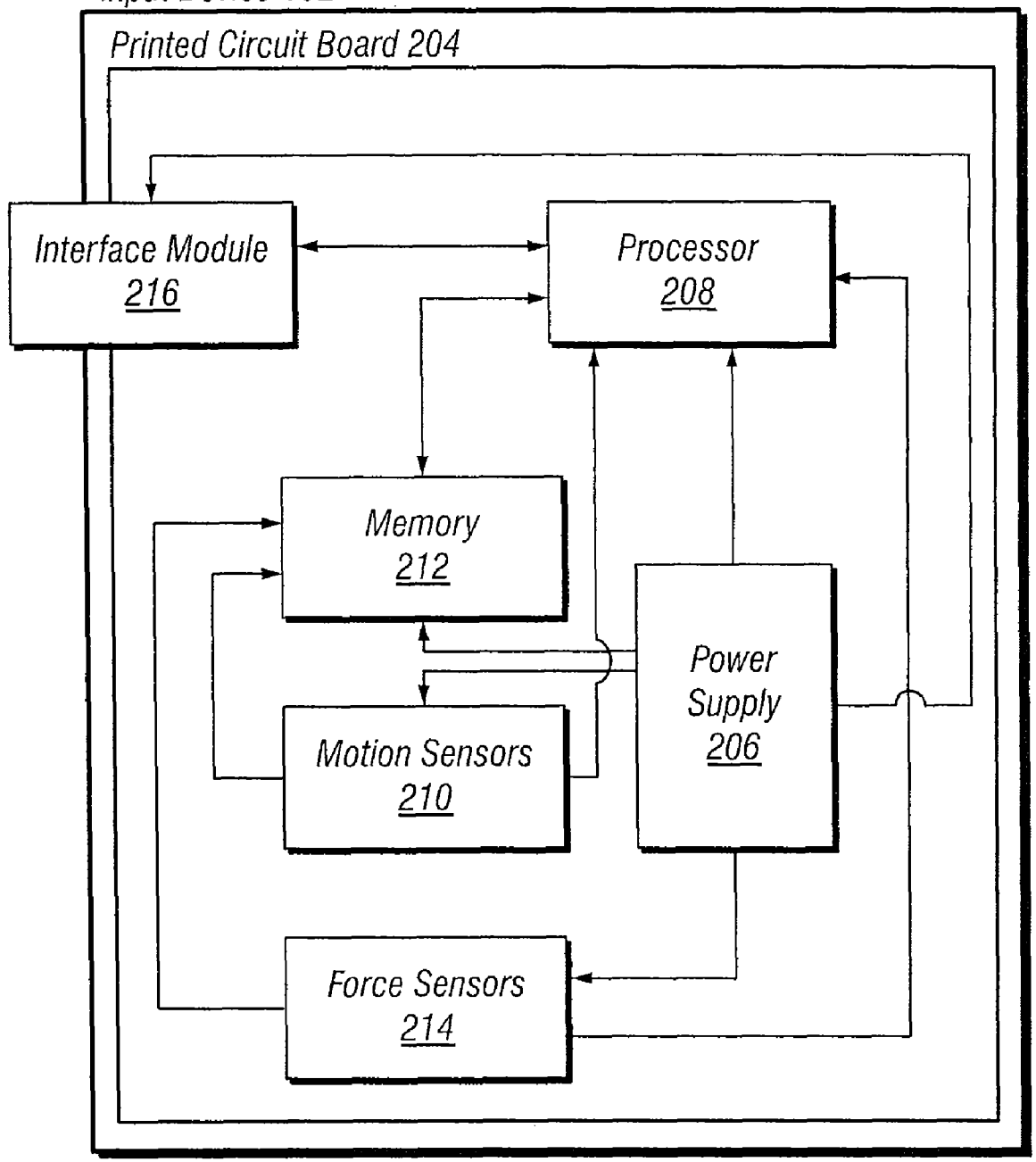
FIG. 2 is a system diagram of a modular arrangement of an input device according to one embodiment of the present invention.

FIG. 2 is a system diagram of a modular arrangement of the input device 102 according to one embodiment of the present invention. The input device 102 houses a printed circuit board 204 enabling communication and data transfer between the connected modules.

A power supply 206 provides a source of power to modules electrically connected to the printed circuit board 204. In some embodiments, power is supplied externally by one or more conductive wires, for example, from a power cable or a serial bus cable. In other embodiments, a battery may be used as a source of power.

A memory 212 comprises any type of module adapted to enable digital information to be stored, retained, and retrieved. Additionally, the memory 212 may comprise any combination of volatile and non-volatile storage devices, including without limitation RAM, DRAM, SRAM, ROM, and/or flash memory. Note also that the memory 212 may be organized in any number of architectural configurations utilizing, for example, registers, memory caches, data buffers, main memory, mass storage, and/or removable media. In some embodiments, the memory 212 is adapted to store gesture profiles comprising force and velocity thresholds and/or applicable ranges for each type of gesture. In alternative embodiments, the gesture profiles are stored in a remote memory source (e.g., the hard drive of the computer 106), and the input device 102 transmits raw data to the computer 106 for storage and processing by one or more memories and processors (not shown) contained within the receiving device.

One or more processors 208 are adapted to execute sequences of instructions by loading and storing data to the memory 212. Possible instructions include, without limitation, instructions for data conversions, formatting operations, communication instructions, and/or storage and retrieval operations. Additionally, the processors 208 may comprise any type of digital processing devices including, for example, reduced instruction set computer processors, general-purpose processors, microprocessors, digital signal processors, gate arrays, programmable logic devices, reconfigurable compute fabrics, array processors, and/or application-specific integrated circuits. Note also that the processors 208 may be contained on a single unitary IC die or distributed across multiple components.

An interface module 216 enables data to be transmitted and/or received between two or more devices. In one embodiment, data transmitted to a receiving device is first packetized and processed according to one or more standardized network protocols. The interface module 216 may accommodate any wired or wireless protocol including, without limitation, USB, FireWire, Ethernet, Gigabit Ethernet, MoCA, radio frequency tuners, modems, WiFi, Bluetooth, WiMax, and/or Infrared Data Association.

One or more motion sensors 210 enable the input device 102 to determine velocity values during a given instant, or alternatively, over a given period of time. Various types of motion sensors, such as gyroscopes, accelerometers, optical sensors, etc. may be used with the present invention. In one embodiment, the motion sensors 210 comprise one or more accelerometers adapted to detect the current acceleration of the input device 102. The accelerometers can measure acceleration of the input device 102 by any number of means, including, for example, inclination sensing, vibration, and/or shock values. In one embodiment, the input device 102 comprises at least one sensor which can track movement of the input device 102 irrespective of any interaction or contact with the surface 104.

In some embodiments, velocity values are determined by logic adapted to integrate a detected acceleration quantity. In one embodiment, the motion sensors 210 are implemented as part of a micro electro-mechanical system (MEMS). Optionally, the micro electro-mechanical system may comprise a dedicated microprocessor adapted to interact with one or more microsensors responsible for receiving external data.

In other embodiments, the motion of the input device 102 is externally determined, such as by a tracking system or one or more transceivers located within communicative range of the input device 102. In one embodiment, the time it takes the transceivers to receive subsequent signals transmitted by the input device 102 is used as a basis to calculate the past or present positional data of the input device 102.

One or more force sensors 214 determine the forces applied to the input device 102. Forces such as a normal force, shear force, frictional force, angular force, or any combination thereof may be measured and utilized in accordance with one or more embodiments of the present invention. Any type of force sensor or force sensor combination may be used for accomplishing force detection, including, for example, switch sensors, contact sensors, and/or accelerometers. Additionally, the force sensors 214 can comprise lightsource/slit/photosensor combinations, or one or more capacitive sensors on a compliant support. In one embodiment, the force sensors 214 detect force independently from the motion sensors 210. Also, according to one embodiment, forces are sensed as surface reactions to one or more input forces (as described in more detail below; see FIG. 5a-5c and accompanying text).

Figure 3:
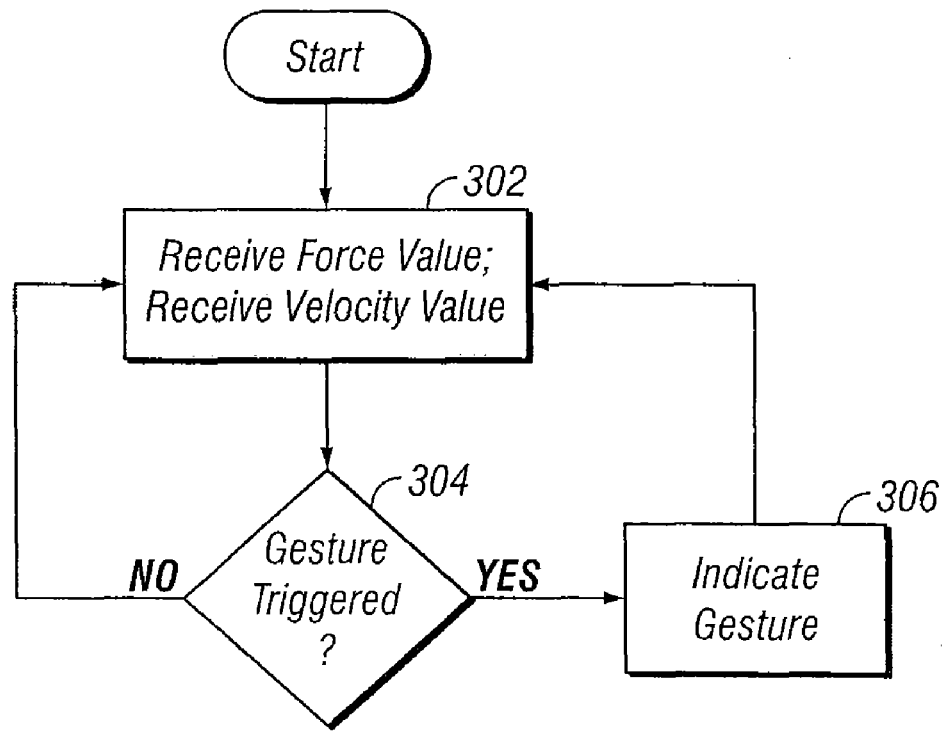
FIG. 3 is a flow diagram illustrating a method of indicating a gesture according to one embodiment of the present invention.

FIG. 3 is a flow diagram illustrating a method of indicating a gesture according to one embodiment of the present invention. At step 302, force values and velocity values are initially received. In some embodiments, force and velocity values are sensed directly from external environmental conditions. In other embodiments, the force and velocity values are derived after receiving data from one or more sensed inputs. For example, in one embodiment, velocity data is derived from integrating a sensed acceleration value or from differentiating a sensed positional value.

At decision block 304 it is determined whether a gesture has in fact been triggered. In one embodiment, a "gesture profile" (which may be stored either locally or remotely) comprises a set of force and velocity ranges and/or timing information which together define the corresponding gesture. Note that force and velocity data need not necessarily match their respective force and velocity ranges simultaneously in order for the gesture to be triggered. For example, in one embodiment, a "tilt and tap" gesture requires a force spike to be detected after a tilt has been detected and not released. In the tilt and tap gesture, the gesture is said to be "enabled" after the tilt occurs (i.e. the input device 102 enters a state where it is now possible for the gesture to be triggered, but the gesture will not be triggered until the occurrence of the last temporal condition required by the gesture profile).

The gesture is then indicated at step 306. In one embodiment, the indication comprises a signal or a set of data transmitted from the input device 102 to a receiving device. In another embodiment, the indication may be generated externally. After the gesture has been indicated, control of the method resumes at step 302 so that additional gestures can be detected.

Figure 4:
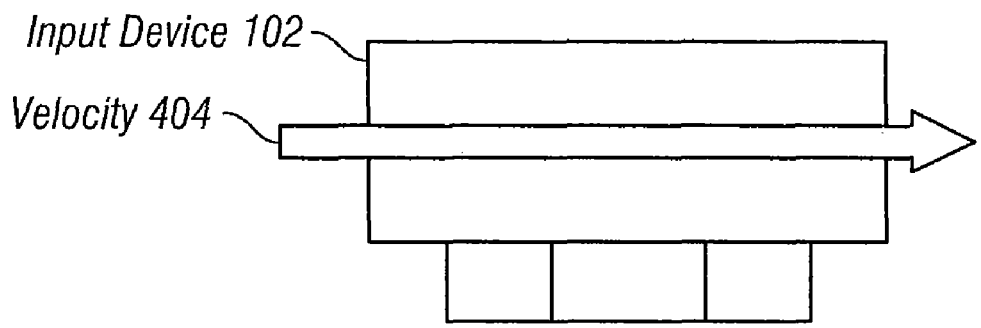
FIG. 4 is a block diagram illustrating an input device with an applied velocity according to one embodiment of the present invention.

FIG. 4 is a block diagram indicating an input device 102 with an applied velocity 404 according to one embodiment of the present invention. Notice that the velocity 404 comprises both a magnitude (length of arrow) and a direction, thus forming a velocity vector. As mentioned above, in some embodiments, one or more motion sensors 210 (such as accelerometers) comprised within the input device 102 are responsible for determining the velocity of the input device 102. In one embodiment, contact, positioning, or movement about the surface 104 is not necessary for the present velocity 404 of the input device 102 to be determined.

In some embodiments, velocity data is not generated when the input device 102 is stationary. However, in one embodiment, gesture profiles may still be defined for a stationary input device 102 by using force sensor 214 inputs. For example, a "press" gesture may be defined as a downward force (above and beyond normal gravitational forces) which is exerted upon a stationary input device 102.

Alternatively, frictional forces associated with a contact surface 104 may overtake lateral forces exerted upon the input device 102 by the user, thus preventing the input device 102 from achieving a non-zero velocity, while still registering force data associated with a defined gesture profile. In other embodiments, a stationary input device 102 may attain a velocity after one or more dynamic forces have been applied to it.

Figure 5A:
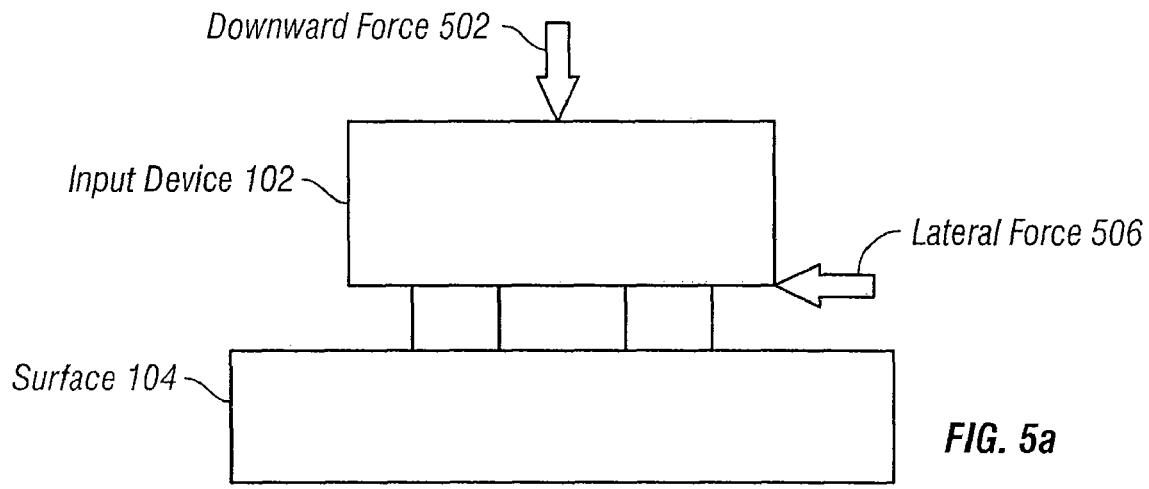
FIG. 5a is a block diagram illustrating a plurality of forces exerting upon an input device according to one embodiment of the present invention.

FIG. 5a is a block diagram indicating an input device 102 having a plurality of forces applied to it according to one embodiment of the present invention. As depicted in the figure, a downward force 502 pushes the input device 102 against the surface 104, while a lateral force 506 pushes the input device 102 across the surface 104. In cases where multiple forces are simultaneously acting upon the input device 102 (i.e. forces comprising separate magnitudes and directions), standard techniques known in physics may be used to calculate a scalar quantity from a given set of force vectors (for example, as by calculating a dot product).

Figure 5B:
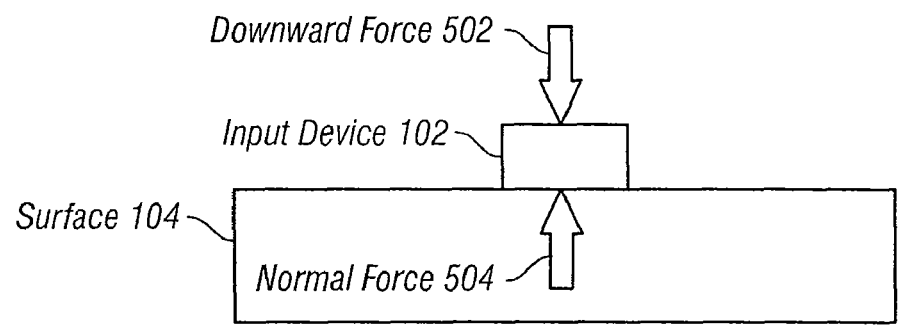
FIG. 5b is a block diagram illustrating a surface reacting to a downward force applied to an input device according to one embodiment of the present invention.
Figure 5C:
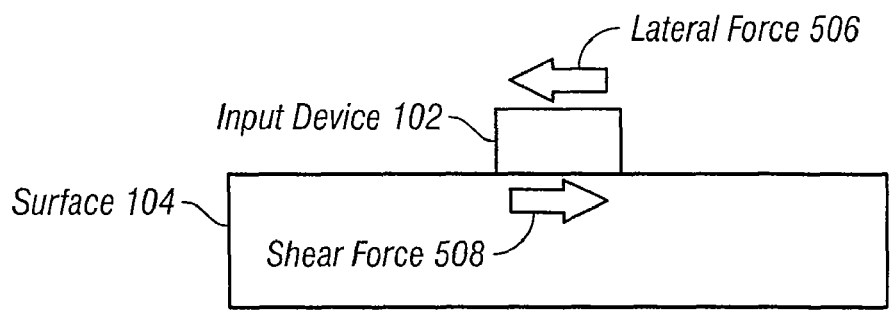
FIG. 5c is a block diagram illustrating a surface reacting to a lateral force applied to an input device according to one embodiment of the present invention.

According to one embodiment, one or more force sensors 214 comprised within the input device 102 are adapted to detect surface reactions to an input force. For example, as shown in FIG. 5b, if the user applies a downward force 502 to the input device 102, the force sensors 214 will detect the force pushing up against the input device 102 (i.e., a normal force 504). As shown in FIG. 5c, if a user applies a lateral force 506 to the input device 102, the force sensors 214 will detect a shear force 508 acting against the direction of the acting lateral force 506.

FIGS. 6-16 depict a plurality of input sequences useful with some embodiments of the present invention. Note that the following input sequences are exemplary in nature and provided herein for illustrative purposes. However, many other gestures and/or input sequences are possible according to embodiments of the present invention.

Figure 6A:
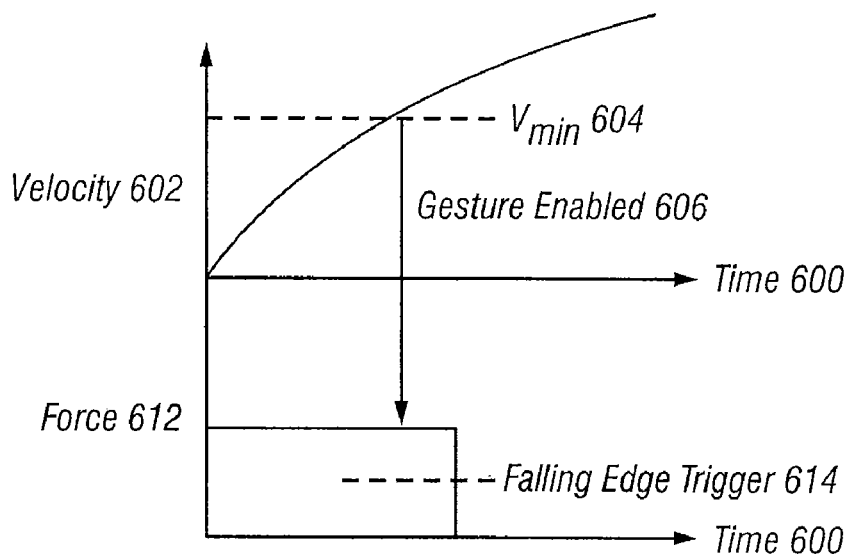
FIG. 6a is a set of graphs depicting a first gesture profile according to one embodiment of the present invention.
Figure 6B:
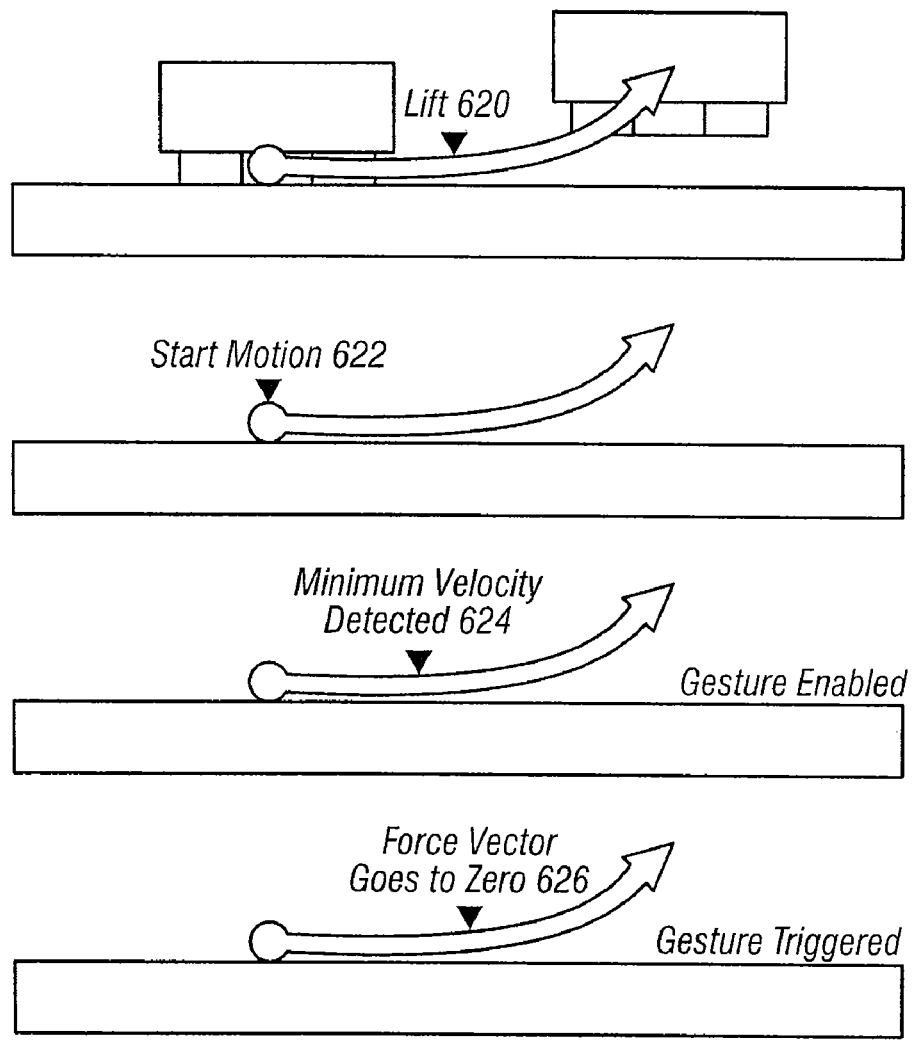

FIG. 6a is a set of graphs depicting a first gesture profile according to one embodiment of the present invention. The set of graphs comprises a force graph and a velocity graph each plotted against a common time axis 600. The graphs together depict a "brush" gesture that is similar to a brushing motion. The brush gesture is comprised of an input sequence where the input device 102 is first moved laterally across a surface 104 and then is subsequently lifted 620 above it (as depicted in FIG. 6b).

The input device 102 is initially at rest, and therefore its velocity is 0 m/s. Then, as the user applies a lateral force to the input device 102, the input device 102 attains a non-zero velocity. The motion commences at start motion 622 which is also depicted in FIG. 6b.

As stated above, a gesture may not be triggered unless the gesture is first enabled. In the present case, the input device 102 must attain a minimum velocity $V_{min}$ 604 before the gesture is enabled. Note that certain gestures may become disabled if the condition for enablement is no longer satisfied before the condition to trigger the gesture becomes satisfied. For example, in the present embodiment, if the input device 102 suddenly stopped after achieving the minimum velocity $V_{min}$ 604, the gesture would become disabled, and subsequently lifting the stationary input device 102 off of the surface 104 would not trigger a brush gesture.

After the minimum velocity $V_{min}$ 604 has been attained (624 in FIG. 6b), the brush gesture is then enabled. Even though the brush gesture is enabled, the gesture will not become triggered until the triggering condition is satisfied. Note that the minimum velocity $V_{min}$ 604 may be implemented for any number of reasons, among others, for preventing a lift of a stationary input device 102 from inadvertently becoming interpreted as a brush. The inadvertent detection of a brush gesture might occur as a result of infinitesimal lateral forces exerted upon the input device 102 as an expected part of the user lifting the input device 102 off of the surface 104. Alternatively, the $V_{min}$ 604 may be implemented to ensure that the lateral forces are of a certain velocity before being interpreted as a brush. For example, in one embodiment, multiple brush gestures are defined such that each gesture comprises a separate velocity threshold. An application may be set to handle "fast brushes" differently than "slow brushes." Alternatively, the application may be set to only accept "fast brushes." Thus, $V_{min}$ 604 may be set according to the application designer's specific preferences.

After the gesture is enabled, a sudden decrease in normal force 504 will then trigger the brush gesture. Since the input device 102 no longer maintains contact with the surface 104 as the input device 102 is lifted above the surface 104, the detected normal force 504 will decrease to zero. In some embodiments, a change in force of a certain magnitude will indicate that the brush gesture has been triggered. Conditions for determining whether the brush gesture has been triggered may be implemented in any number of ways. In one embodiment, the gesture is triggered upon detecting a discontinuity or a falling edge 614 after the latest instant in time when the gesture was enabled. In other embodiments, the actual magnitude of the detected normal force 504 determines whether the gesture has been triggered. Thus, if the present magnitude of the normal force 504 comprises a zero magnitude, the gesture will become triggered.

In still other cases, both a direction and a predetermined magnitude are used to determine whether the gesture has been triggered. For example, a falling edge 614 may determine a decrease in force, while a zero magnitude normal force satisfies the predetermined magnitude of the brush triggering condition. Thus, the gesture becomes triggered when the magnitude of the normal force vector decreases to zero (as indicated by reference numeral 626 in FIG. 6b).

Figure 7:
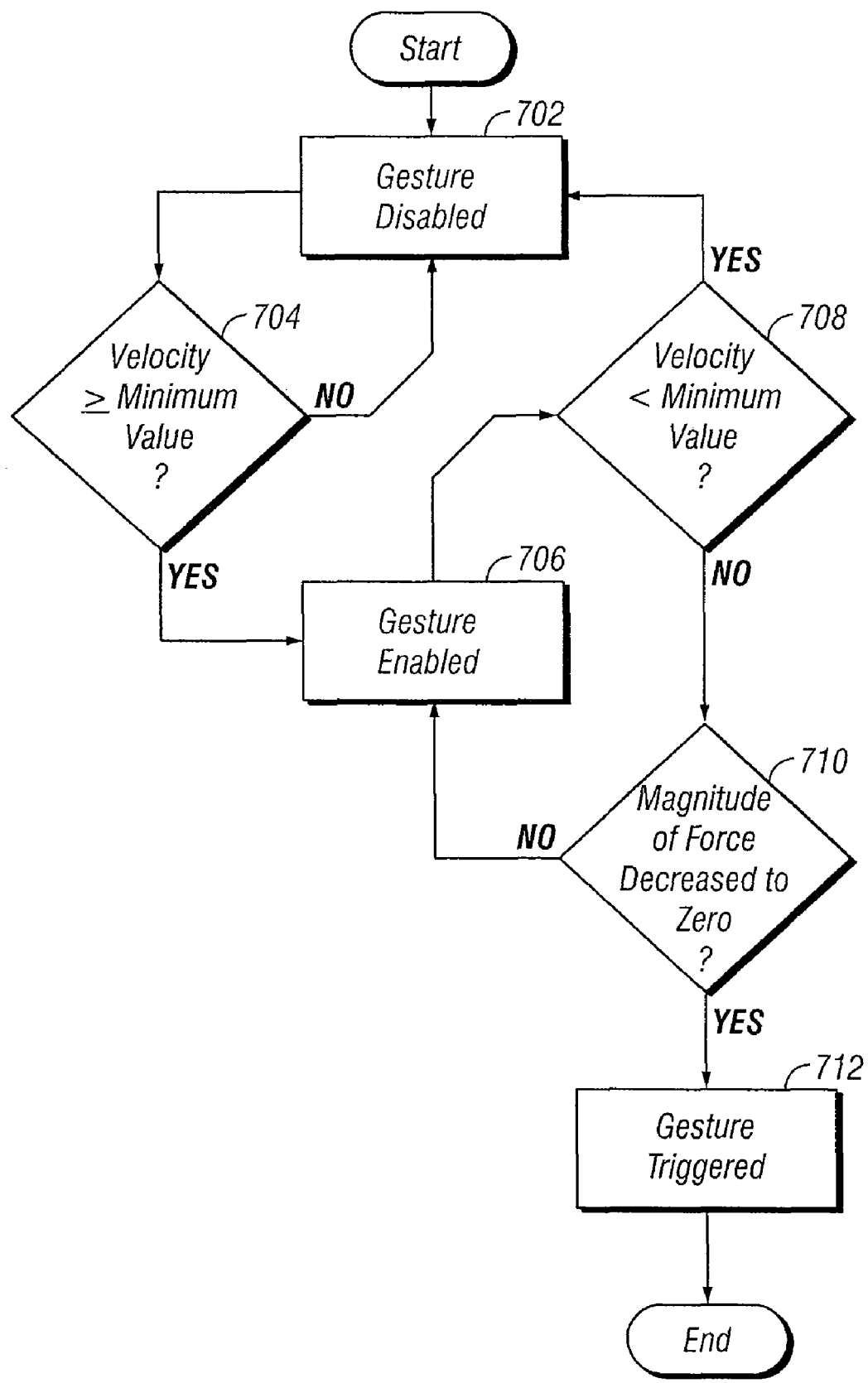
FIG. 7 is flow diagram illustrating a method of implementing the gesture illustrated in FIGS. 6a and 6b.

FIG. 7 is flow diagram illustrating one method of implementing the brush gesture profile depicted in FIGS. 6a and 6b. The gesture is initially disabled at step 702. At decision block 704, if the determined velocity is greater than or equal to a designated minimum value $V_{min}$ 604, the gesture becomes enabled at step 706. Otherwise, the gesture remains disabled at step 702.

If the gesture is enabled at step 706, control then passes to decision block 708. If the present velocity decreases beneath the predetermined minimum value $V_{min}$ 604, the gesture becomes disabled at step 702. Otherwise, control passes to decision block 710 where it is then determined whether the magnitude of the normal force has decreased to zero. If it has, the gesture is triggered at step 712 and the process ends. Otherwise, the process repeats at step 706.

Figure 8A:
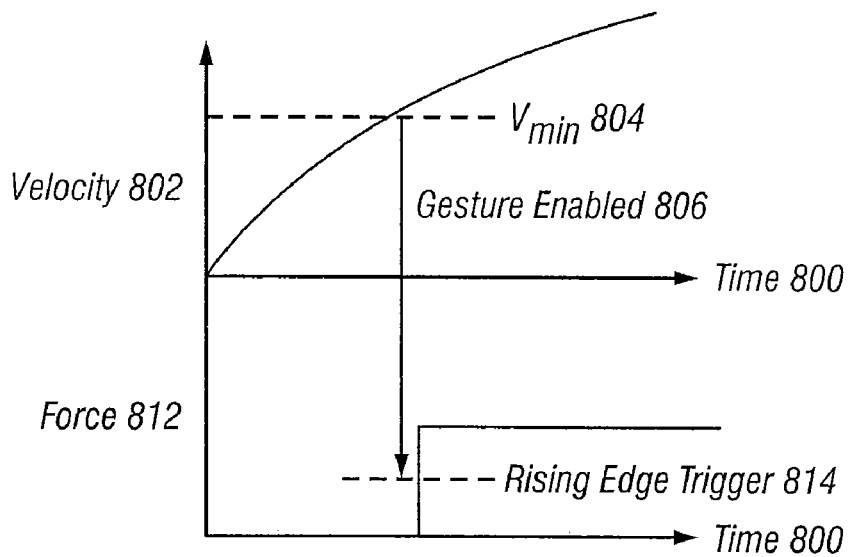
FIG. 8a is a set of graphs depicting a second gesture profile according to one embodiment of the present invention.
Figure 8B:
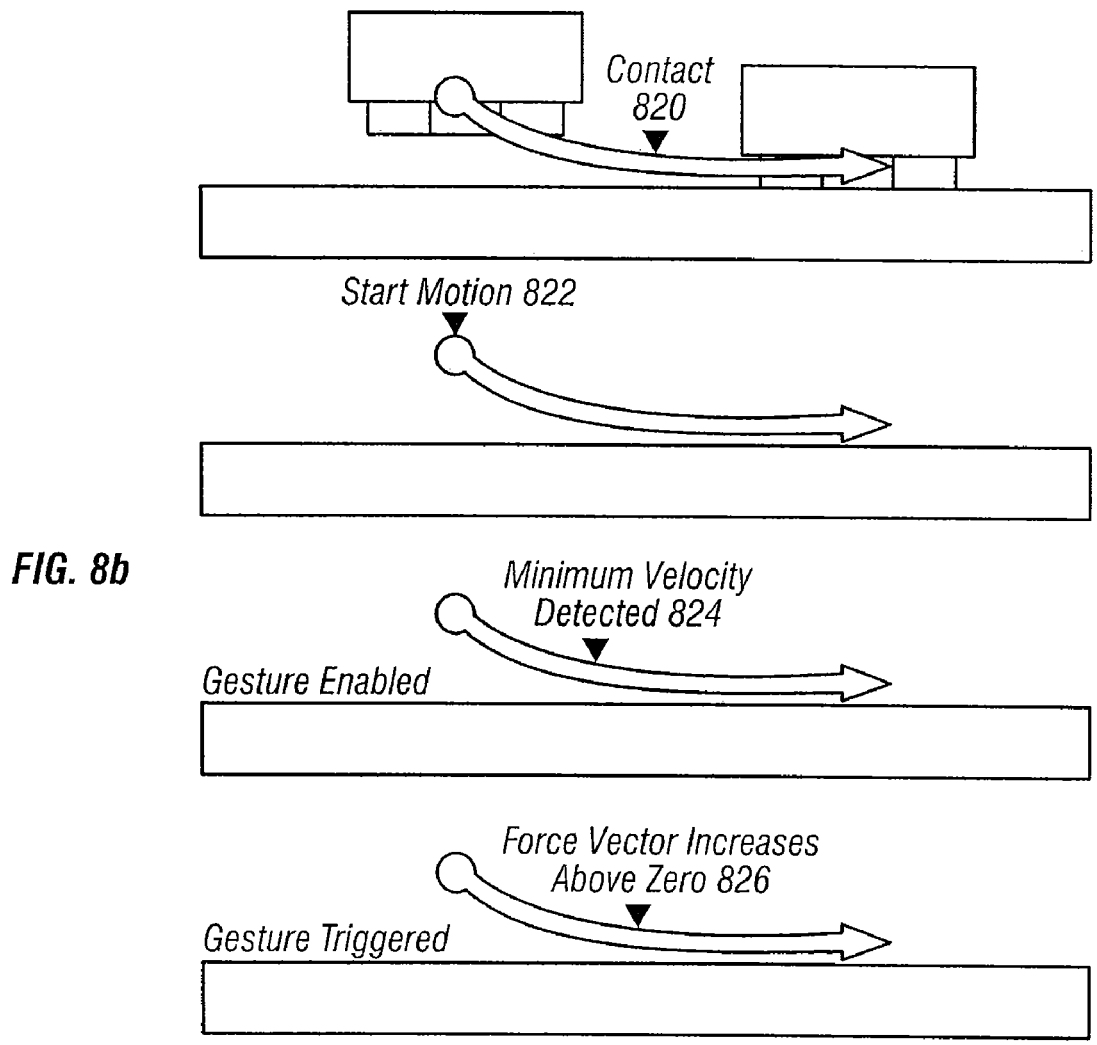

FIG. 8a is a set of graphs depicting a second gesture profile according to one embodiment of the present invention. As in FIG. 6a, the set of graphs comprises a force graph and a velocity graph plotted against a common time axis 800. The graphs together depict a "scoop" gesture that is similar to a scooping motion. The scoop gesture is comprised of an input sequence where the input device 102 first moves laterally above a surface 104 and then subsequently establishes contact with the surface 104. The input sequence is depicted in FIG. 8b.

The input device 102 is initially held stationary above the surface 104, thus comprising a velocity of 0 m/s. Then, as the user applies a lateral force to the input device 102, the input device 102 attains a non-zero velocity. The user's motion commences at start motion 822 which is also depicted in FIG. 8b.

As before, the input device 102 must attain a certain minimum velocity $V_{min}$ 804 in order for the gesture to become enabled. Once the gesture becomes enabled, the gesture is triggered upon contact 820 with the surface 104. In one embodiment, determining whether the scoop gesture has been triggered is accomplished by detecting a discontinuity or a rising edge 814 occurring after the latest instant in time when the gesture was enabled. In other embodiments, the actual magnitude of the detected normal force 504 determines whether the gesture has been triggered. For example, the scoop gesture may be implemented such that the gesture becomes triggered when the present magnitude of the normal force 504 comprises a magnitude greater than or equal to a designated minimum value.

In other embodiments, both a direction and a predetermined magnitude are used in combination to determine whether the gesture has been triggered. For example, a rising edge 814 may determine an increase in force, while a normal force with a magnitude greater than zero satisfies the predetermined magnitude of the scoop triggering condition. Thus, the gesture becomes triggered when the force vector exceeds a zero magnitude normal force (as indicated by reference numeral 826 in FIG. 8b).

Figure 9:
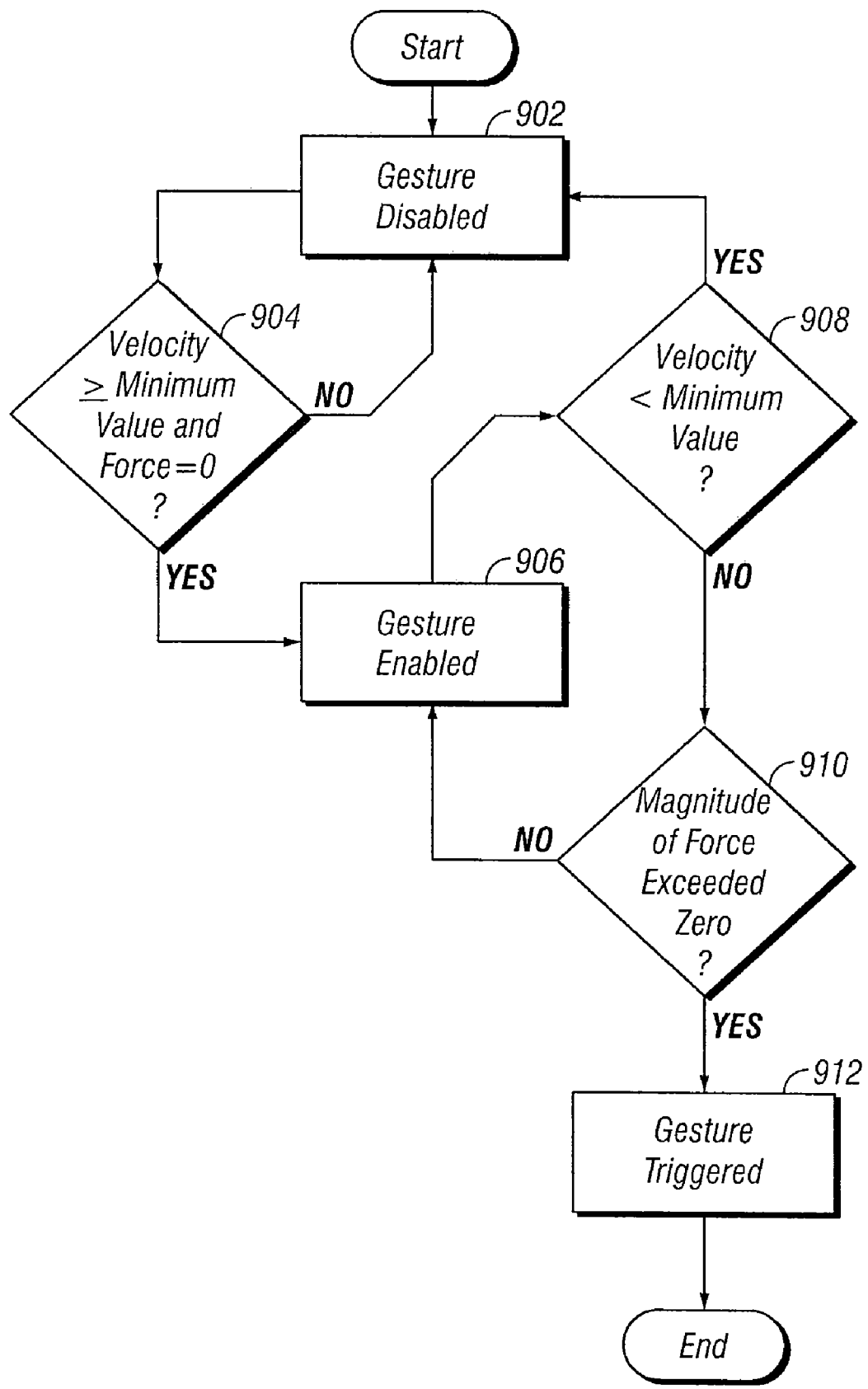
FIG. 9 is flow diagram illustrating a method of implementing the gesture illustrated in FIGS. 8a and 8b.

FIG. 9 is flow diagram illustrating one method of implementing the scoop gesture profile depicted in FIGS. 8a and 8b. The gesture is initially disabled at step 902. At decision block 904, if the determined velocity is greater than or equal to a designated minimum value $V_{min}$ 804 and the magnitude of the detected normal force is zero, the gesture becomes enabled at step 906. Otherwise, the gesture remains disabled at step 902.

If the gesture is enabled at step 906, control then passes to decision block 908. If the present velocity decreases beneath the predetermined minimum value $V_{min}$ 904, the gesture becomes disabled at step 902. Otherwise, control passes to decision block 910 where it is then determined whether the magnitude of the normal force has exceeded zero. If it has, the gesture is triggered at step 912 and the process ends. Otherwise, the process repeats at step 706.

Figure 10A:
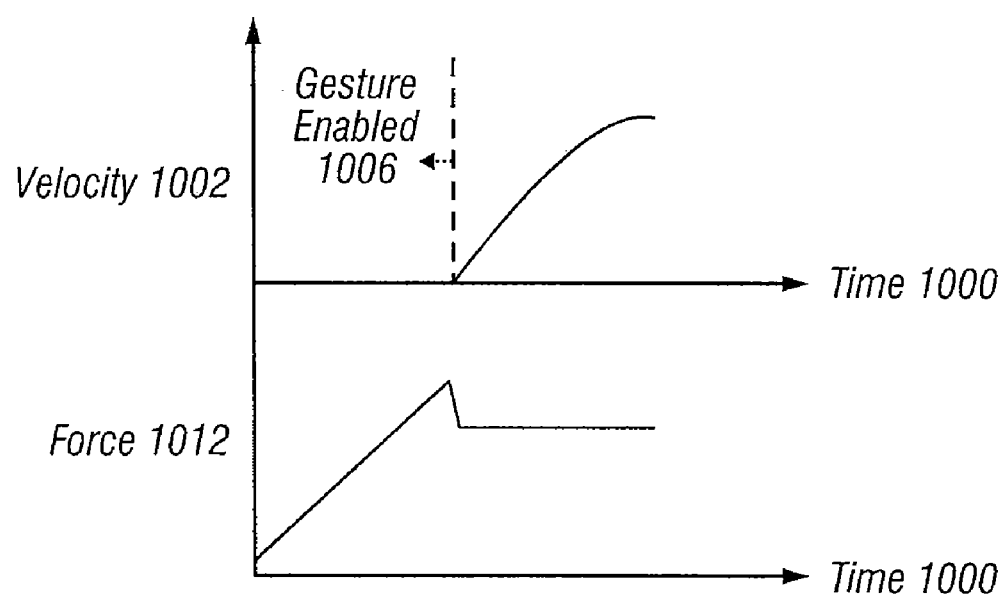
FIG. 10a is a set of graphs depicting a third gesture profile according to one embodiment of the present invention.
Figure 10B:
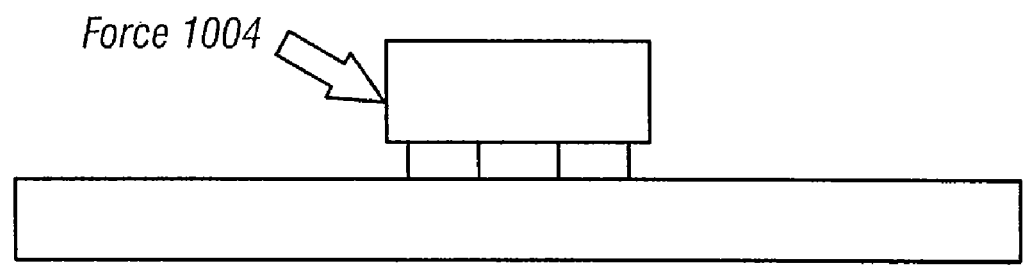

FIG. 10a is a set of graphs depicting a third gesture profile according to one embodiment of the present invention. As above, the set of graphs comprises a force graph and a velocity graph plotted against a common time axis 1000. The graphs together depict a "nudge" gesture. The nudge gesture is comprised of an input sequence where a stationary input device receives an input force from a user. The input sequence is depicted in FIG. 10b.

Unlike the previously described gestures, the nudge gesture is enabled when the input device 102 is stationary (i.e., its velocity is 0 m/s). Thus, a stationary input device 102 is already in a state where the gesture may become triggered upon occurrence of the triggering condition. In the present case, the triggering condition comprises the input device 102 receiving an external, non-gravitational force 1004.

The nudge gesture may be implemented in any number of ways. For example, in one embodiment, once the input device 102 receives a force 1004 comprising a magnitude greater than or equal to a designated minimum value, the gesture becomes triggered. In one embodiment, the minimum value is set to be equal to the minimum amount of force it takes to overtake opposing frictional forces (i.e. for sliding across the surface 104 to occur). Some embodiments also require the angle of the force to fall within a designated range. In one embodiment, for example, the vector angle must range from 10° to 20° when measured from a vertical axis.

In some embodiments, the nudge profile is adapted to reduce lag/dead zone from the motion sensor. The lag can be a result of energy conservation modes or limited report intervals on the input device 102. In some embodiments, non-activity places the input device 102 into a sleep mode, where certain triggers serve to "wake-up" the input device 102 in order to resume gesture detection. The sleep/wake-up function may be implemented in any number of ways. For example, in one embodiment, a period of non-activity places the motion sensors 210 into a sleep mode, while the force sensors 214 remain active. If the force sensors 214 detect a force exceeding a certain threshold, the detected force may serve to indicate a "just about to move" situation which initiates the wake-up process of the motion sensors 210. In one embodiment, motion occurring before or during the wake-up process is simply ignored.

Figure 11:
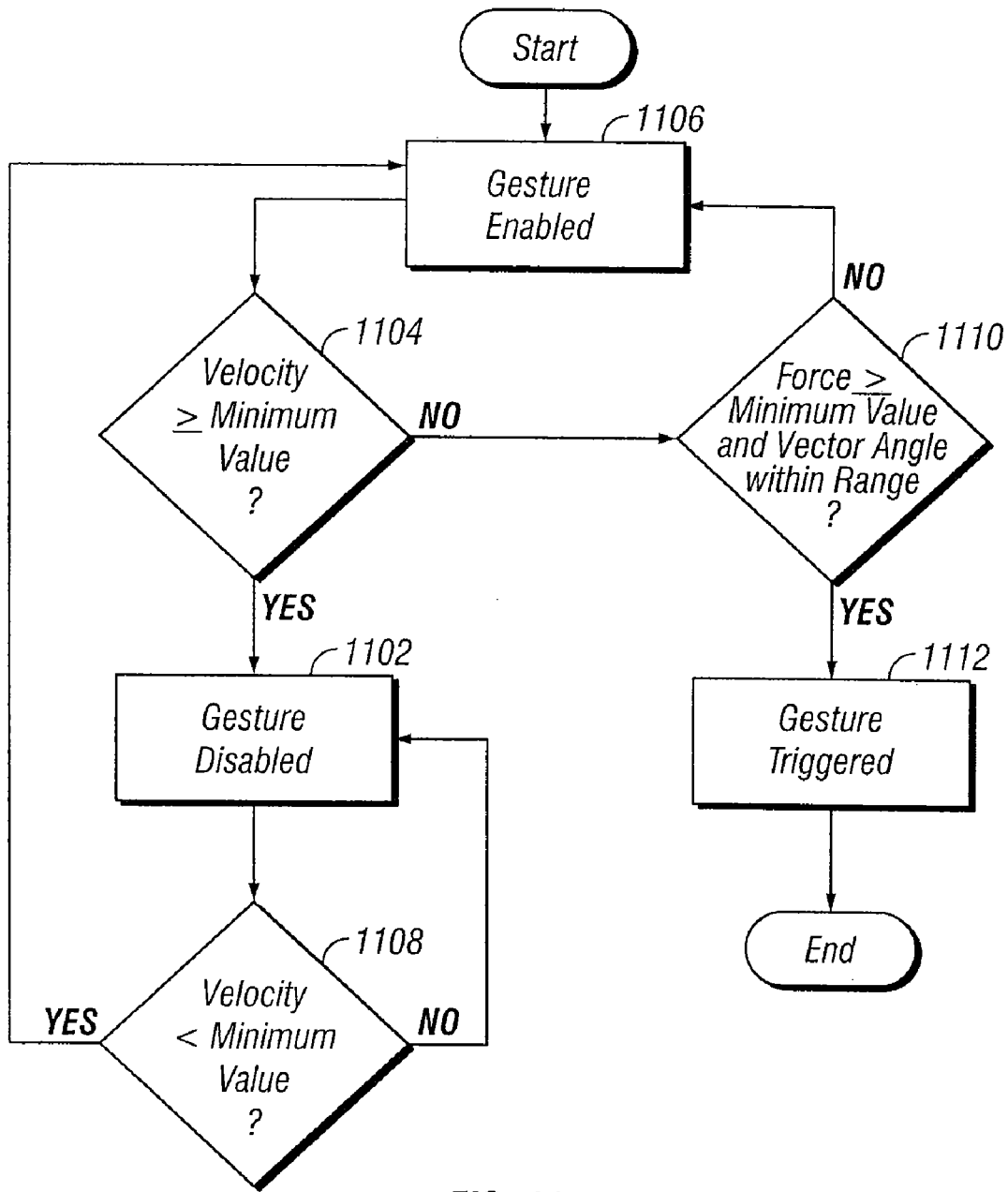
FIG. 11 is flow diagram illustrating a method of implementing the gesture illustrated in FIGS. 10a and 10b.

FIG. 11 is flow diagram illustrating one method of implementing the nudge gesture profile depicted in FIGS. 10a and 10b. The gesture is initially enabled at step 1106. At decision block 1104, if the determined velocity is greater than or equal to a designated minimum velocity value, the gesture becomes disabled at step 1102. As illustrated in decision block 1108, the gesture may become enabled at a later period if the present velocity decreases beneath the minimum velocity value.

On the other hand, if the present velocity is not greater than or equal to the minimum velocity value at decision block 1104, control then passes to decision block 1110. At decision block 1110, if the presently detected force is greater than a designated minimum force value, and the vector angle is within a designated range, then the gesture is triggered at step 1112, and the process ends. Otherwise, the process resumes at step 1106.

Figure 12:
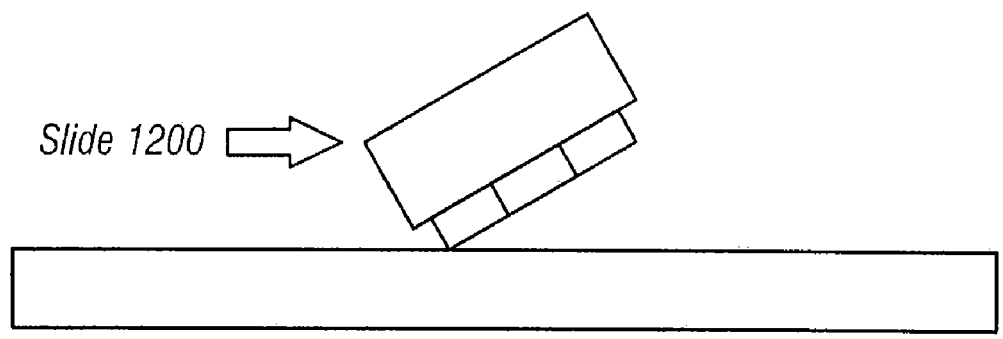
FIG. 12 is a block diagram depicting a fourth gesture profile according to one embodiment of the present invention.

FIG. 12 is a block diagram depicting a fourth gesture profile according to one embodiment of the present invention. The figure depicts a "tilt and drag" gesture comprising of an input sequence where the input device 102 is first tilted and then slid in a direction that is perpendicular to its tilt axis.

In one embodiment, the gesture is enabled upon detecting that the input device 102 has been tilted. Tilt detection may be implemented in any number of ways. For example, in one embodiment, the gesture is enabled if there is a detected decrease in z-direction acceleration in a first region of the input device 102 along with a detected increase in z-direction acceleration in a second region of the device (i.e., in the direction of tilt). In another embodiment, the input device 102 comprises a tilt sensor adapted to sense the inclination of the input device 102. The gesture is enabled when the detected inclination falls within a certain range when measured from a reference axis. In one embodiment, for example, the range comprises 20°-60° when measured from a horizontal axis.

Once the direction of tilt and/or tilt axis has been ascertained, the gesture will become triggered if a slide 1200 occurs in a direction that is perpendicular to the tilt axis. In some embodiments, force and/or vibration signals detected by the force sensors 214 are utilized as part of the slide detection process. In one embodiment, data generated from both the force sensors 214 and the motion sensors 210 are used to detect the magnitude and direction of the slide 1200.

Figure 13:
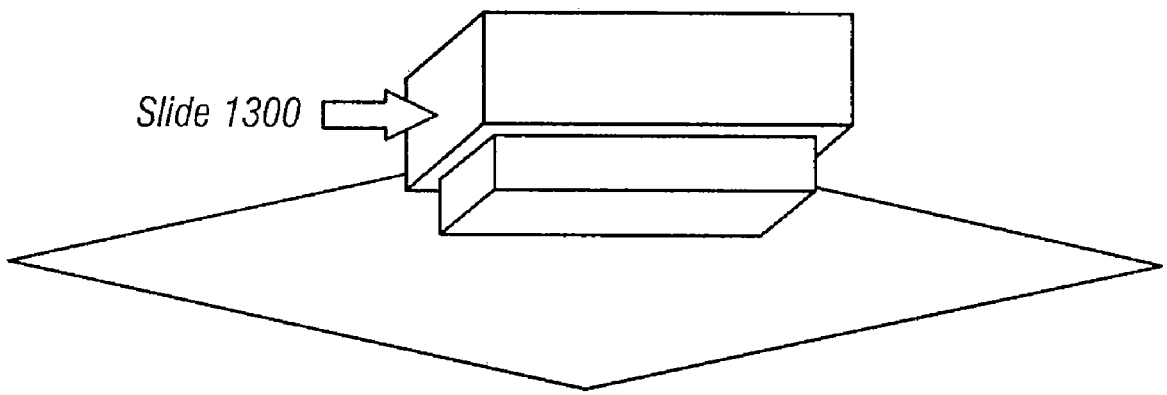
FIG. 13 is a block diagram depicting a fifth gesture profile according to one embodiment of the present invention.

FIG. 13 is a block diagram depicting a fifth gesture profile according to one embodiment of the present invention. FIG. 13 depicts a "tilt and drag" sequence that is very similar to the gesture already described in FIG. 12. However, instead of the slide 1300 occurring in a direction that is perpendicular to the tilt axis, as shown in FIG. 12, the slide 1300 in FIG. 13 occurs in a direction that is parallel with the tilt axis. In some embodiments, the tilt and drag gesture is implemented in the same manner as already described with respect to FIG. 12 while taking into account directional differences.

Figure 14:
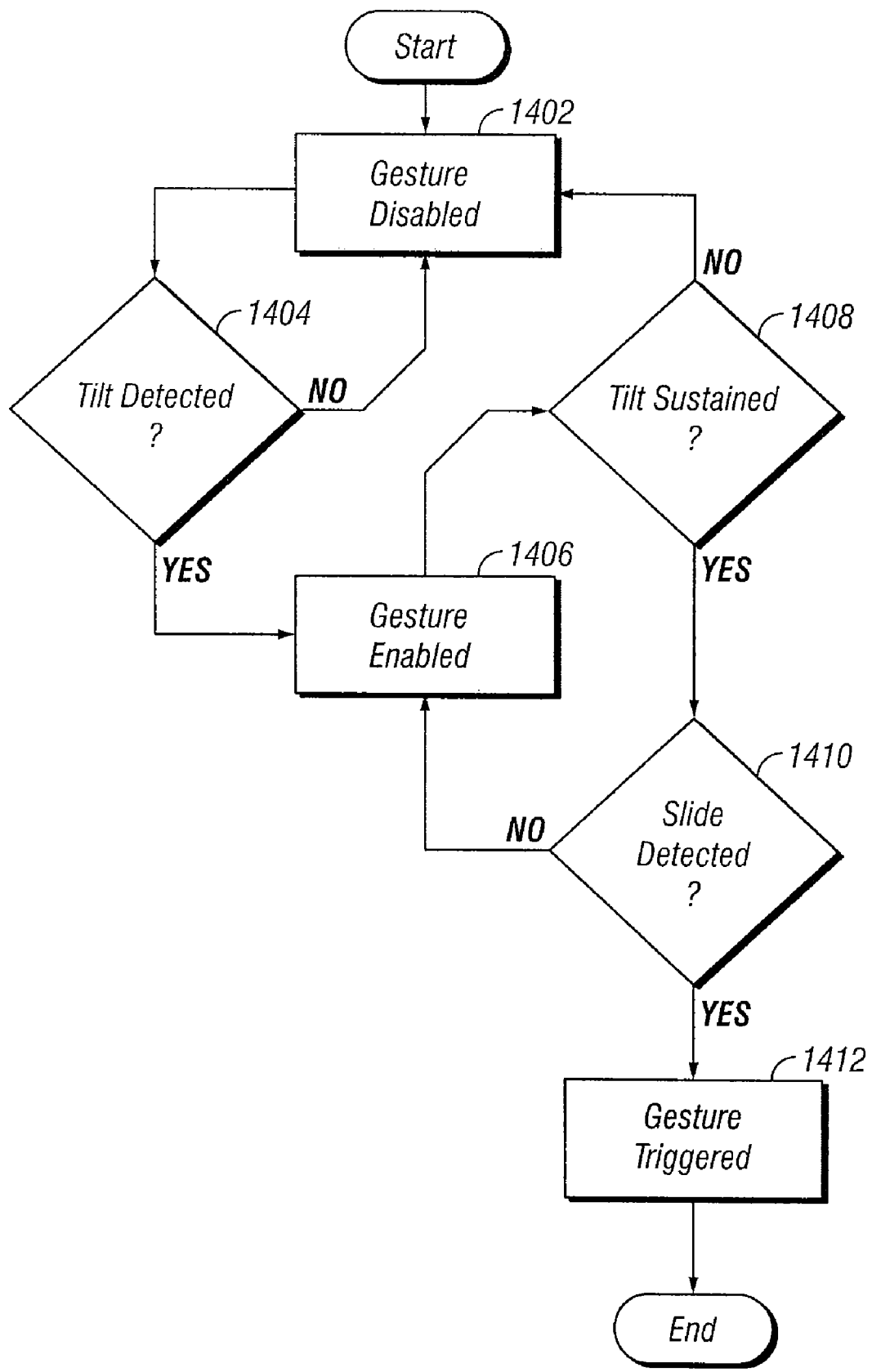
FIG. 14 is a flow diagram illustrating a method of implementing the gestures illustrated in FIGS. 12 and 13.

FIG. 14 is a flow diagram illustrating one method of implementing the tilt and drag gesture profiles depicted in FIGS. 12 and 13. The gesture is initially disabled at step 1402. At decision block 1404, if tilt has been detected, the gesture becomes enabled at step 1406. Otherwise, the gesture remains disabled at step 1404.

If the gesture is enabled at step 1406, control then passes to decision block 1408. If tilt has been released, the gesture becomes disabled at step 1402. Otherwise, control passes to decision block 1410 where it is then determined whether a slide has been detected. If a slide has been detected, the direction of the slide is then determined, and the corresponding gesture is triggered at step 1412. Otherwise, the process repeats at step 1406.

Figure 15A:
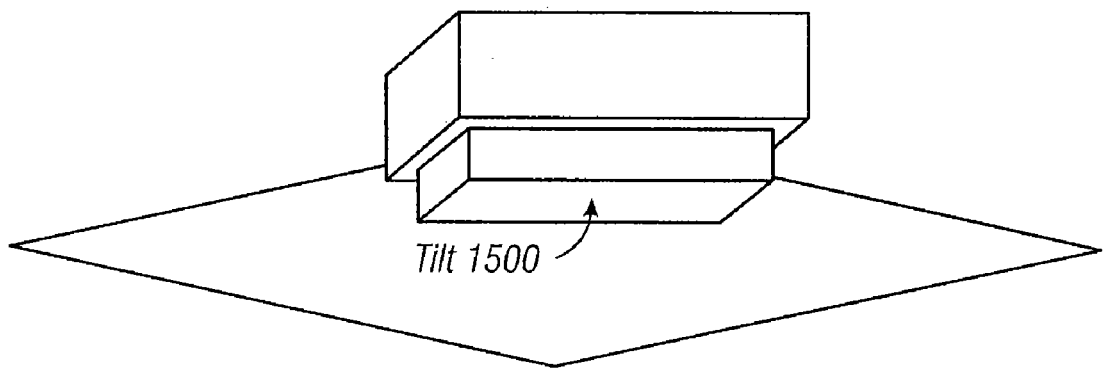
FIG. 15a is a block diagram depicting a method of enabling a sixth gesture according to one embodiment of the present invention.
Figure 15B:
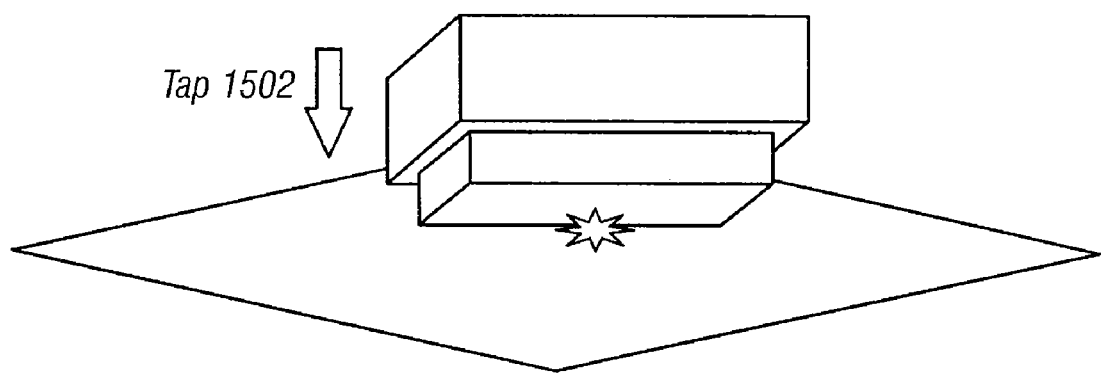

FIGS. 15a and 15b are block diagrams depicting a sixth gesture profile according to one embodiment of the present invention. These figures depict a "tilt and tap" gesture comprising of an input sequence where the input device 102 is first tilted and then tapped against a surface 104.

FIG. 15a is a block diagram depicting a method of enabling the tilt and tap gesture according to one embodiment of the present invention. In some embodiments, the gesture is enabled in the same manner as described with respect to FIGS. 12-14. In one embodiment, the gesture is enabled if there is a detected decrease in z-direction acceleration in a first region of the input device 102 along with a detected increase in z-direction acceleration in a second region of the device (i.e., in the direction of tilt). In another embodiment, the input device 102 comprises a tilt sensor adapted to sense the inclination of the input device 102. The gesture is enabled when the detected inclination falls within a certain range when measured from a reference axis. In one embodiment, the range comprises 20°-60° when measured from a horizontal axis.

As shown in FIG. 15b, once the direction of tilt and/or tilt axis has been ascertained, the gesture will become triggered if a tap is subsequently detected. Tap detection may be implemented in any number of ways. For example, according to one embodiment, an impulse in acceleration corresponding to the first region of the device and/or one or more force signals indicate motion of the input device 102 followed by contact with a surface 104 (i.e., a single tap). Note also that in some embodiments, additional taps trigger to separate gestures or map to separate gesture profiles (e.g., double-taps and triple-taps). In one embodiment, the tilt must be released before an additional tilt and tap sequence may be generated. In another embodiment, a temporal threshold indicates how much time is allowed for a subsequent tap to be received after a prior tap. If the temporal threshold is exceeded, any subsequent tap will indicate a single tap.

Figure 16:
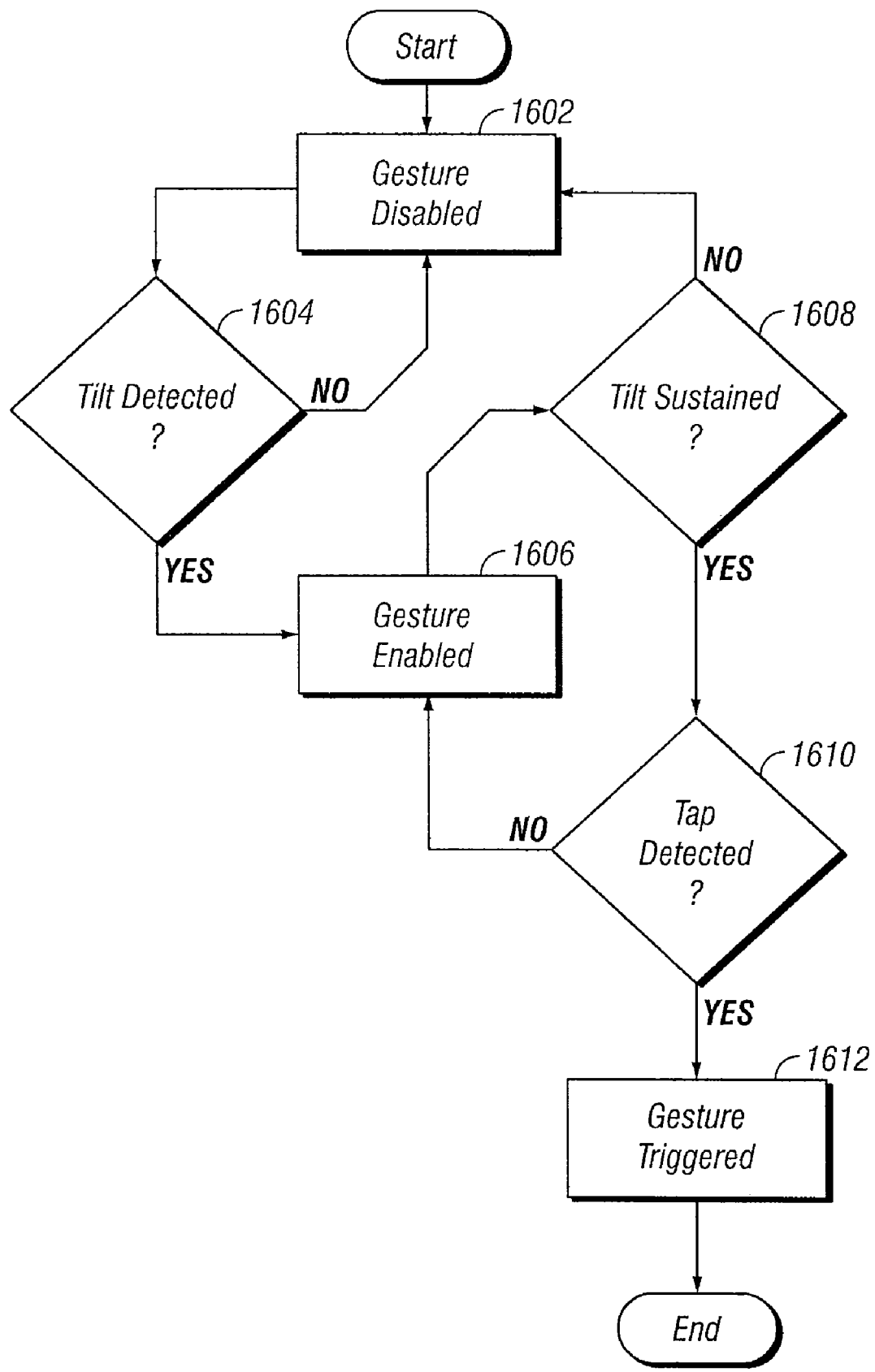
FIG. 16 is a flow diagram illustrating a method of implementing the gesture profile depicted in FIGS. 15a and 15b.

FIG. 16 is a flow diagram illustrating one method of implemented the tilt and tap gesture profile depicted in FIGS. 15a and 15b. The gesture is initially disabled at step 1602. At decision block 1604, if tilt has been detected, the gesture becomes enabled at step 1606. Otherwise, the gesture remains disabled at step 1604.

If the gesture is enabled at step 1606, control then passes to decision block 1608. If tilt has been released, the gesture becomes disabled at step 1602. Otherwise, control passes to decision block 1610 where it is then determined whether a tap has been detected. If a tap has been detected, the gesture is triggered at step 1612. Otherwise, the process repeats at step 1606.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. An input system comprising:
   one or more sensors operable to output one or more physical parameters of an input device reflective of at least one of, a force applied to the input device by a user, a speed of motion of the input device, a direction of motion of the input device, and an acceleration of the input device;
   one or more processors;
   one or more computer readable memories comprising instructions that, when executed by the one or more processors, perform operations comprising,
      determining, based on an output of at least one sensor, an angle of tilt of the input device about a tilt axis;
      determining if the angle of tilt of the input device is within a predetermined range;
      if the angle of tilt is within the predetermined range, operating the input system in a gesture mode in which the output of the sensors is monitored to determine if a gesture of at least one predetermined gesture has been performed; and
      if the angle of tilt is not within the predetermined range, outputting a signal to move a cursor displayed on a graphical user interface based on a velocity of movement of the input device along a surface, the velocity determined based on the output of the at least one sensor.

2. The input system of claim 1, wherein the input system comprises a mouse.

3. The input system of claim 2, wherein the one or more sensors, one or more processors and one or more computer readable memories are contained within a single housing of the mouse.

4. The input system of claim 1, wherein at least one of the computer readable memories further stores one or more profiles, each profile corresponding to a respective predetermined gesture; and
   wherein the operations further comprise determining if the predetermined gesture has been performed based on the output of the sensors and the profile corresponding to the gesture.

5. The input system of claim 4, wherein the profiles comprise a profile corresponding to a tilt and drag gesture.

6. The input system of claim 4, wherein the profiles comprise a profile corresponding to a tilt and tap gesture.

7. An input system comprising:
   one or more sensors operable to output one or more physical parameters of an input device reflective of at least one of, a force applied to the input device by a user, a speed of motion of the input device, a direction of motion of the input device, and an acceleration of the input device;
one or more processors; and
one or more computer readable memories comprising instructions that, when executed by the one or more processors, perform operations comprising,
  determining, based on an output of the one or more sensors, if a gesture of a plurality of predetermined gestures has been performed, each predetermined gesture comprising a ordered set of conditions on one or more physical parameters of the input device;
  if the gesture has been performed, outputting a signal corresponding to the performed gesture; and
  if a gesture has not been performed, outputting a signal to move a cursor displayed on a graphical user interface based on a velocity of movement of the input device along a surface, the velocity determined based on the output of the one or more sensors.

8. The input system of claim 7, wherein the input system comprises a mouse.

9. The input system of claim 8 wherein the one or more sensors, one or more processors and one or more computer readable memories are contained within a single housing of the mouse.

10. The input system of claim 7, wherein the one or more computer readable memories further stores one or more profiles, each profile corresponding to a respective one of the predetermined gestures; and
wherein the operations further comprise determining if the gesture of the at least one predetermined gesture has been performed based on the output of the sensors and the profile corresponding to the gesture.

11. The input system of claim 10, wherein the profiles comprise a profile corresponding to a brush gesture.

12. The input system of claim 10, wherein the profiles comprise a profile corresponding to a scoop gesture.

13. The input system of claim 10, wherein the profiles comprise a profile corresponding to a nudge gesture.

14. A method for operating an input device of a computing system comprising:
in a first mode,
  outputting a signal to move a cursor displayed on a graphical user interface based on a velocity of movement of the input device along a surface,
  monitoring one or more parameters of the input device to detect a satisfaction of a first condition of a set of ordered conditions for a predefined gesture, and
  upon detecting the satisfaction of the first condition, changing to a second mode;
in the second mode,
  monitoring one or more parameters of the input device to detect satisfaction of a second condition of the set of ordered conditions for a predefined gesture, and
  upon detecting the satisfaction of the second condition while in the second mode, executing the predefined gesture; and
wherein either the first condition is based at least in part on a force applied to the input device and the second condition is based at least in part on a velocity of motion of the device or the first condition is based at least in part on a velocity of motion of the device and the second condition is based at least in part on a force applied to the input device.

15. The method of claim 14, wherein:
the first condition is satisfied if the velocity of motion of the input device exceeds a designated value; and
the second condition is satisfied if the force applied to the input device decreases to a first magnitude.

16. The method of claim 15, wherein the first magnitude comprises 0 newtons.

17. The method of claim 14, wherein:
the first condition is satisfied if the velocity of motion of the input device exceeds a designated value while the force applied to the input device comprises 0 newtons; and
the second condition is satisfied if the force applied to the input device increases to a first magnitude.

18. The method of claim 14, wherein:
the first condition is satisfied if the velocity of motion of the input device comprises a magnitude of zero meters per second; and
the second condition is satisfied if the force applied to the input device comprises a vector angle within a designated range.

19. The method of claim 14, wherein the second mode further comprises the operations of:
monitoring one or more parameters of the input device to detect satisfaction of a third condition of the set of ordered conditions for a predefined gesture; and
upon detecting the satisfaction of the third condition while in the second mode, changing to the first mode.

20. A method for operating an input device of a computing system comprising:
in a first mode,
  outputting a signal to move a cursor displayed on a graphical user interface based on a velocity of movement of the input device along a surface,
  monitoring one or more parameters of the input device to detect a satisfaction of a first condition of a set of ordered conditions for a predefined gesture, and
  upon detecting the satisfaction of the first condition, changing to a second mode;
in the second mode,
  monitoring one or more parameters of the input device to detect satisfaction of a second condition of the set of ordered conditions for a predefined gesture, and
  upon detecting the satisfaction of the second condition while in the second mode, executing the predefined gesture; and
wherein the first condition is based at least in part on an angle of tilt of the input device about a tilt axis and the second condition is based at least in part on at least one of a velocity of motion of the device and a force applied to the input device.

21. The method of claim 20, wherein the angle of tilt of the input device about a tilt axis is determined based at least in part on data from an inclination sensor.

22. The method of claim 20, wherein the angle of tilt of the input device about a tilt axis is determined by determining if a first acceleration quantity has increased to a first magnitude while a second acceleration quantity has decreased to a second magnitude.

23. The method of claim 20, wherein:
the first condition is satisfied if the angle of tilt comprises an angle within a predetermined range; and
the second condition is satisfied if the force comprises a direction that is parallel with the tilt axis.

24. The method of claim 20, wherein:
the first condition is satisfied if the angle of tilt comprises an angle within a predetermined range; and
the second condition is satisfied if the force comprises a direction that is perpendicular the tilt axis.

25. The method of claim 20, wherein:
the first condition is satisfied if the angle of tilt comprises an angle within a predetermined range; and
the second condition is satisfied if the force decreases to a second magnitude after increasing to a first magnitude.

26. The method of claim 20, wherein:
the first condition is satisfied if the angle of tilt comprises an angle within a predetermined range; and
the second condition is satisfied if, while a change in acceleration is detected, the force decreases to a second magnitude after increasing to a first magnitude.

27. The method of claim 20, wherein the second mode further comprises the operations of:
monitoring one or more parameters of the input device to detect satisfaction of a third condition of the set of ordered conditions for a predefined gesture; and
upon detecting the satisfaction of the third condition while in the second mode, changing to the first mode.

28. At least one computer readable memory comprising instructions which, when executed by at least one processor, perform operations comprising:
in a first mode,
outputting a signal to move a cursor displayed on a graphical user interface based on a velocity of movement of an input device along a surface,
monitoring one or more parameters of the input device to detect a satisfaction of a first condition of a set of ordered conditions for a predefined gesture, and
upon detecting the satisfaction of the first condition, changing to a second mode;
in the second mode,
monitoring one or more parameters of the input device to detect satisfaction of a second condition of the set of ordered conditions for a predefined gesture, and
upon detecting the satisfaction of the second condition while in the second mode, executing the predefined gesture; and
wherein either the first condition is based at least in part on a force applied to the input device and the second condition is based at least in part on a velocity of motion of the device or the first condition is based at least in part on a velocity of motion of the device and the second condition is based at least in part on a force applied to the input device.

29. The at least one computer readable memory of claim 28, wherein:
the first condition is satisfied if the velocity of motion of the input device exceeds a designated value; and
the second condition is satisfied if the force applied to the input device decreases to a first magnitude.

30. The at least one computer readable memory of claim 28, wherein:
the first condition is satisfied if the velocity of motion of the input device exceeds a designated value while the force applied to the input device comprises 0 newtons; and
the second condition is satisfied if the force applied to the input device increases to a first magnitude.

31. The at least one computer readable memory of claim 28, wherein:
the first condition is satisfied if the velocity of motion of the input device comprises a magnitude of zero meters per second; and
the second condition is satisfied if the force applied to the input device comprises a vector angle within a designated range.

32. The at least one computer readable memory of claim 31, wherein the designated range comprises a range of between 10° and 20° when measured from a vertical axis.

33. The at least one computer readable memory of claim 28, wherein the second mode further comprises the operations of:
monitoring one or more parameters of the input device to detect satisfaction of a third condition of the set of ordered conditions for a predefined gesture; and
upon detecting the satisfaction of the third condition while in the second mode, changing to the first mode.

34. At least one computer readable memory comprising instructions which, when executed by at least one processor, perform operations comprising:
in a first mode,
outputting a signal to move a cursor displayed on a graphical user interface based on a velocity of movement of an input device along a surface,
monitoring one or more parameters of the input device to detect a satisfaction of a first condition of a set of ordered conditions for a predefined gesture, and
upon detecting the satisfaction of the first condition, changing to a second mode;
in the second mode,
monitoring one or more parameters of the input device to detect satisfaction of a second condition of the set of ordered conditions for a predefined gesture, and
upon detecting the satisfaction of the second condition while in the second mode, executing the predefined gesture; and
wherein the first condition is based at least in part on an angle of tilt of the input device about a tilt axis and the second condition is based at least in part on at least one of a velocity of motion of the device and a force applied to the input device.

35. The at least one computer readable memory of claim 34, wherein the angle of tilt of the input device about a tilt axis is determined based at least in part on data from an inclination sensor.

36. The at least one computer readable memory of claim 34, wherein the angle of tilt of the input device about a tilt axis is determined by determining if a first acceleration quantity has increased to a first magnitude while a second acceleration quantity has decreased to a second magnitude.

37. The at least one computer readable memory of claim 34, wherein:
the first condition is satisfied if the angle of tilt comprises an angle within a predetermined range; and
the second condition is satisfied if the force comprises a direction that is parallel with the tilt axis.

38. The at least one computer readable memory of claim 34, wherein:
the first condition is satisfied if the angle of tilt comprises an angle within a predetermined range; and
the second condition is satisfied if the force comprises a direction that is perpendicular the tilt axis.

39. The at least one computer readable memory of claim 34, wherein:
the first condition is satisfied if the angle of tilt comprises an angle within a predetermined range; and
the second condition is satisfied if the force decreases to a second magnitude after increasing to a first magnitude.

40. The at least one computer readable memory of claim 34, wherein:
the first condition is satisfied if the angle of tilt comprises an angle within a predetermined range; and the first condition is satisfied if, while a change in acceleration is detected, the force decreases to a second magnitude after increasing to a first magnitude.

41. The at least one computer readable memory of claim 34, wherein the second mode further comprises the operations of:

monitoring one or more parameters of the input device to detect satisfaction of a third condition of the set of ordered conditions for a predefined gesture; and upon detecting the satisfaction of the third condition while in the second mode, changing to the first mode.

* * * * *